(12) United States Patent
Xiong et al.

(10) Patent No.: US 11,194,009 B2
(45) Date of Patent: Dec. 7, 2021

(54) POSITION DETECTION OF USER EQUIPMENT WITHIN A WIRELESS TELECOMMUNICATIONS NETWORK

(71) Applicant: Alcatel Lucent, Nozay (FR)

(72) Inventors: Zhilan Xiong, Bristol (GB); Matthew Baker, Cambridge (GB)

(73) Assignee: Alcatel Lucent, Nozay (FR)

( * ) Notice: Subject to any disclaimer, the term of this patent is extended or adjusted under 35 U.S.C. 154(b) by 465 days.

(21) Appl. No.: 16/325,143

(22) PCT Filed: Aug. 10, 2017

(86) PCT No.: PCT/EP2017/070324
§ 371 (c)(1),
(2) Date: Feb. 12, 2019

(87) PCT Pub. No.: WO2018/029298
PCT Pub. Date: Feb. 15, 2018

(65) Prior Publication Data
US 2019/0285721 A1    Sep. 19, 2019

(30) Foreign Application Priority Data
Aug. 12, 2016 (EP) .................................. 16183945

(51) Int. Cl.
*H04W 64/00* (2009.01)
*G01S 5/02* (2010.01)
(Continued)

(52) U.S. Cl.
CPC .......... *G01S 5/0215* (2013.01); *G01S 5/0036* (2013.01); *G01S 5/021* (2013.01); *G01S 5/0268* (2013.01);
(Continued)

(58) Field of Classification Search
CPC ...... G01S 5/0215; G01S 5/0036; G01S 5/021; G01S 5/0268; G01S 5/0273; G01S 5/10; H04W 64/00
(Continued)

(56) References Cited

U.S. PATENT DOCUMENTS 7,737,893 B1    6/2010 Furman et al.
2009/0149132 A1    6/2009 Lefever et al.
(Continued)

FOREIGN PATENT DOCUMENTS

CA    2984482 A1 * 11/2016    ........... G01S 5/0036
JP    2001298768 A    10/2001
WO    2015112430 A1    7/2015

OTHER PUBLICATIONS

English Bibliography of Japanese Application No. JP2001298768A, Published on Oct. 26, 2001, Printed from Derwent Innovation on Jul. 28, 2020, 5 pages.
(Continued)

*Primary Examiner* — Harry K Liu
(74) *Attorney, Agent, or Firm* — Fay Sharpe LLP

(57) ABSTRACT

A user equipment, user equipment method, location server, location server method and computer program are disclosed. The method performed at the user equipment comprises: monitoring for a position reference signal broadcast by a network node; measuring a time of arrival of a peak in a received signal indicative of receipt of said position reference signal and measuring a time of arrival of at least one further peak in said received signal; transmitting a time offset signal indicative of a time difference between said arrival of said at least one further peak and said peak as part of an enhanced reference time difference signal.

23 Claims, 2 Drawing Sheets

(51) Int. Cl.
 G01S 5/00 (2006.01)
 G01S 5/10 (2006.01)
(52) U.S. Cl.
 CPC .............. G01S 5/0273 (2013.01); G01S 5/10 (2013.01); H04W 64/00 (2013.01)
(58) Field of Classification Search
 USPC ........................................................ 342/451
 See application file for complete search history.

(56) References Cited

U.S. PATENT DOCUMENTS

| | | |
|---|---|---|
| 2010/0309051 A1 | 12/2010 | Moshfeghi |
| 2011/0143770 A1 | 6/2011 | Carbit et al. |
| 2014/0266904 A1 | 9/2014 | Sendonaris et al. |
| 2015/0215729 A1 | 7/2015 | Opshaug et al. |
| 2015/0257121 A1* | 9/2015 | Siomina ................ G01S 5/0226 455/456.6 |
| 2015/0319634 A1* | 11/2015 | Zwirn .................... H04W 24/10 370/252 |
| 2018/0027595 A1* | 1/2018 | Wang .................. H04W 72/042 370/329 |
| 2018/0054286 A1* | 2/2018 | Tang ..................... H04B 7/0456 |
| 2018/0077679 A1* | 3/2018 | Lee ......................... H04W 4/70 |
| 2018/0270784 A1* | 9/2018 | Lee ......................... H04W 64/00 |

OTHER PUBLICATIONS

Extended European Search Report for Application No. 16183945.1, dated Jan. 5, 2017, 10 pages.
Written Opinion of the International Searching Authority for PCT Application No. PCT/EP2017/070324, dated Sep. 13, 2017, 8 pages.
International Search Report for PCT/EP2017/070324 dated Sep. 13, 2017.

* cited by examiner

POSITION DETECTION OF USER EQUIPMENT WITHIN A WIRELESS TELECOMMUNICATIONS NETWORK

FIELD OF THE INVENTION

The field of the invention relates to the position detection of user equipment within a wireless telecommunications network.

BACKGROUND

Observed time difference of arrival (OTDOA) is a downlink positioning method used in networks for detecting a user equipment's position. In particular, network nodes transmit position reference signals (PRSs) and these are detected by user equipment (UE). The time of arrival (ToA) of the different PRSs at the user equipment from the network nodes is determined. A reference signal time difference measurement (RSTD) is made at the user equipment based on the ToA of the different PRSs at the user equipment, from which the UE's location can then be derived.

This determination of user equipment position is based on the assumption that the PRS signal travels directly to the user equipment via a line of sight LoS route. Where the signal travels via a non line of sight NLoS route then the user equipment will appear to be further from the network node than it is and inaccuracies will arise in the determination of user equipment position.

It is desirable to be able to increase the accuracy of positional measurement for user equipment.

SUMMARY

A first aspect of the present invention provides, a method performed at a user equipment comprising: monitoring for a position reference signal broadcast by a network node; measuring a time of arrival of a peak in a received signal indicative of receipt of said position reference signal and measuring a time of arrival of at least one further peak in said received signal; transmitting a time offset signal indicative of a time difference between said arrival of said at least one further peak and said peak as part of an enhanced reference time difference signal.

The inventors of the present invention recognised that when estimating a position of a user equipment using OTDOA (observed time difference of arrival) measurements it is generally assumed that the RSTD (reference signal time difference) measurements received from the user equipment are based on received reference signals that traveled to the user equipment via a direct Line of Sight route. In reality there may be multiple paths to a user equipment from a network node some of which are NLoS routes as is shown for example in FIG. 1 and this will result in multiple peaks in a received signal at the user equipment. Conventionally the user equipment has determined the arrival of the PRS signal in response to detecting a peak in the signal, generally a first peak above a certain threshold amplitude, and has used the time of arrival of this peak in its RSTD measurement.

Where there are multiple peaks the incorrect peak may be selected and errors may arise. One possible way of addressing this might be to transmit multiple RSTD measurements based on the time difference of arrival of multiple peaks in one PRS signal to the time of arrival of a reference signal. This involves manipulation of the signals at the user equipment and the transmission of multiple signals, which is expensive on signalling.

The inventors of the present invention recognised that a better way of addressing this problem might be to transmit a time offset signal indicating a time difference between at least two peaks in the signal to the location server as part of an enhanced RSTD signal. The location server receives information from many user equipment and is aware of the configuration information for the PRS signals for the different network nodes and has estimation circuitry for estimating UE's position from this information. It is therefore well placed to determine which of the multiple peaks received at a user equipment might relate to a PRS signal travelling by a LoS route. Thus, by simply transmitting this information and leaving it to the location server to assess it, a scheme that is both efficient in terms of bandwidth of signalling and in terms of improved estimation is provided.

In some embodiments, said step of measuring said time of arrival comprises measuring a time of arrival of a plurality of further peaks; and said step of transmitting said time offset comprises transmitting a time offset indicative of a time difference between said arrival of each of said further peaks and said peak.

Although in some embodiments, there may only be two peaks or in some cases where there are not multiple paths, only one peak, in some embodiments there will be multiple peaks and in which case the time offset may be indicative of a time difference between the arrival of each of the further peaks and the peak. In some cases where the signal is particularly noisy, the number of peaks measured may be limited and only a subset of the further peaks may be included in the assessment. In this regard, in some cases the user equipment may be configured to only measure the time of arrival of a certain number of peaks or a number of peaks occurring within a certain time period. Peaks are generally determined to be peaks where the signal rises above a particular threshold amplitude.

In other embodiments, said step of measuring said time of arrival comprises measuring a time of arrival of a plurality of further peaks; and said step of transmitting said time offset comprises transmitting a time offset indicative of a time difference between an arrival of each of said peaks subsequent to a first peak and an immediately preceding peak.

In some cases, rather than determining a time offset between each peak and one particular peak, often the first peak, the time offset between adjacent peaks may be determined. An advantage of this is that the time offset determined in this way is smaller and therefore can generally be sent with fewer bits.

In some embodiments, said peak comprises a first peak in said position reference signal received by said user equipment and said at least one further peak comprises at least one subsequent peak received by said user equipment.

As noted previously, the peak against which the time offset is measured may be the first peak. In this regard, generally the first peak is indicative of the quickest time of arrival and therefore may well indicative a direct LoS route. In other embodiments, the peak might be one selected by the user equipment as a baseline peak. In this regard, the peaks may have different sizes and thus the user equipment may select as the baseline peak a first peak with an amplitude above a certain value. Where this is the case and there is a preceding peak, then the offset time may be a negative time.

In some embodiments, said step of measuring said time of arrival comprises measuring a time of arrival of a plurality of further peaks; and averaging a time of arrival of a subset of said peaks, in some cases a first and a final peak of said received position reference signal and transmitting said averaged time of arrival as said offset signal.

In some cases, rather than determining a time difference between peaks or a subset of peaks, the offset signal may comprise an average of the times of arrivals of multiple peaks. Such an average signal may be compared by a location server with a RSTD signal and used to determine whether the RSTD signal might need to be corrected.

In some embodiments, the method further comprises monitoring for a further position reference signal broadcast by a further network node; measuring a time of arrival of a peak in a received signal indicative of receipt of said further position reference signal; wherein said further network node comprises a reference network node, and said method further comprises: transmitting a time difference between said measured time of arrival of said peak of said position reference signal and said measured time of arrival of said peak of said further position reference signal as a reference signal time difference measurement.

In order to generate a reference signal time difference measurement, a time of arrival of a signal received from a reference node is compared with a time of arrival of a signal received from another node. The difference between the times of arrival are transmitted as a reference signal time difference measurement. In addition to this, as part of the enhanced reference time difference signal, a time offset signal is transmitted. This time offset signal may be the time offset of peaks of the reference node or it may be a time offset signal for peaks of the signal from the other node or there may be time offset signals for both of the nodes.

It may be advantageous to transmit a time offset signal for the reference node as it used in many calculations for determining the position of the user equipment and thus it is important that it is accurate. However, in other embodiments, it may be preferable to transmit a time offset value not for the reference node but for another node. In this regard, the reference node is often selected by the user equipment as the node from which it receives the strongest signal. The signal therefore is a low noise signal and may have a very clear LoS peak and thus, the need to correct the time of arrival of the signal for the multiple path effect may be less likely to arise for this node.

In some embodiments, the method further comprises monitoring for a further position reference signal broadcast by a further network node; measuring a time of arrival of a peak in a received signal indicative of receipt of said further position reference signal and measuring a time of arrival of at least one further peak in said received signal; transmitting a time offset signal indicative of a time difference between said arrival of said at least one further peak and said peak as part of an enhanced reference time difference signal.

Although a time offset signal may be used as an enhanced RSTD signal for just one of the nodes, perhaps the reference node or the neighbouring node(s), or it may be used for a subset of the nodes, in other embodiments it may be used for each of the nodes. Transmitting a time offset value for all nodes where there are multiple peaks above a certain threshold amplitude increases signalling overhead but may also increase accuracy.

In some embodiments, the method further comprises an initial step of receiving a request signal, said request signal indicating that an enhanced reference time difference signal should be transmitted.

In some cases, whether or not the enhanced reference time difference signal is measured and transmitted by a user equipment will depend on whether or not a location server has requested this.

In some embodiments, the method further comprises measuring an amplitude of said peak and said at least one further peak and transmitting a signal indicative of said amplitudes.

Further information which may help the location server to determine which of the peaks relates to the signal travelling directly via a LoS route from the network node to the user equipment may be the amplitude of the different peaks and thus, in some embodiments some information indicative of the amplitude of the peaks is transmitted by the user equipment.

In some embodiments, said signal indicative of said amplitudes comprises an amplitude offset signal indicative of a difference in amplitude between said peak and said at least one further peak.

The amplitude may be indicated in a number of ways and in some embodiments it is indicated as an offset signal, such that the difference in amplitude between peaks is transmitted. In this regard, similarly to the time offset, this may be a difference in amplitude between a first peak and subsequent peaks or it may be a difference in amplitude between a baseline peak selected by the user equipment and further peaks. Transmitting the amplitude information as an offset signal is one way of reducing the amount of data that is transmitted.

In some embodiments, said signal indicative of said amplitudes comprises an indication of an amplitude of at least one of said peaks.

Alternatively and/or additionally, the signal indicative of the amplitude may comprise an indication of an amplitude of at least one of the peaks. It may be that the amplitude of just one peak is indicated and where an offset signal has been sent, then the amplitude of other peaks may be determined from these values.

In some embodiments, said signal indicative of said amplitudes comprises a signal indicative of an average value of said amplitudes of said peak and said at least one further peak.

Alternatively and/or additionally, the signal indicative of the amplitude may comprise a signal indicative of an average value of the amplitude of the peak and of the at least one further peak.

In some embodiments, the time offset signal comprises a signal comprising a sequence of values indicative of time offsets of a plurality of peaks Where the time offset signal is indicative of time offsets of a plurality of peaks then it may be transmitted as a sequence of values. In some embodiments, these sequence of values may comprise a sequence of integer, each integer being indicative of a different time value. Transmitting the information in this way is a low bandwidth way of transmitting it. The integers may, for example, indicate positions in a table relating to different time values. Alternatively, each integer may map to a particular time value, or may represent a particular increment in a time value from a starting value.

A second aspect of the present invention provides a method performed at a location server comprising: receiving at least one enhanced reference time difference signal comprising: a reference signal time difference measurement indicating a difference in time of arrival between a signal from one network node and from a reference network node, and at least one time offset signal indicating a time difference between an arrival of peaks in a position reference signal received at said user equipment from at least one of said network node and said reference network node.

Where a user equipment has the capability of providing enhanced reference time difference signals, then this may be triggered by a request from the location server, which transmits, perhaps via a network node, an enhanced position measurement request to the user equipment. Where the user equipment has this capability, then it will respond with an enhanced reference time difference signal which will include the time offset signal. Where the user equipment does not have this capability, it may indicate this in a response or it may simply send conventional reference time difference signals.

In some embodiments the method further comprises analysing said time offset signal to estimate a time of arrival of said position reference signal at said user equipment travelling to said user equipment via a line of sight route; and updating said reference time difference signal where said analysis indicates a line of sight route time of arrival of said position reference signal is different to said time of arrival of said peak.

The location server will receive the enhanced reference time difference signals from user equipment with this capability and in some cases some conventional reference time difference signals from conventional user equipment and will use these to determine the user equipment position.

Where it receives enhanced reference time difference signals, then it can analyse the time offset signal and use this to estimate a time of arrival of the position reference signal at the user equipment that traveled to it by a direct LoS route. In this regard, the location server has visibility of the positions of the different network nodes and also the predicted position of the user equipment and thus, it can use such information in its analysis along with the offset signal which may include time differences in peaks but may in some embodiments also include an indication of amplitudes of the peaks. In this way, it may determine that the time of arrival signal that was used in the reference time difference signal probably has some error associated with it due to the multi-path effect and in response to this the location server may calculate a corrected time of arrival and use this to update the RSTD signal, the updated signal then being used in the position measurements. In this way, with a limited amount of additional data being transmitted from user equipment to the location server, an improved position detection can be made.

In some embodiments, said method comprises an initial step of transmitting an enhanced reference time difference signal request to at least one user equipment.

The location server may request the enhanced RSTD signals by transmitting a request to the user equipment.

A third aspect of a present invention provides a computer program which when executed by a processor is operable to control said processor to perform a method according to any one of a first or second aspect of the invention.

A fourth aspect of the invention provides a user equipment comprising: control circuitry for controlling said user equipment to monitor for a position reference signal broadcast by a network node; measurement circuitry configured to detect and measure a time of arrival of a peak in a received signal and to detect and measure a time of arrival of at least one further peak in said received signal; determining circuitry configured to determine a time difference between said arrival of said at least one further peak and said peak; transmitting circuitry configured to transmit a time offset signal indicative of said determined time difference as part of an enhanced reference time difference signal.

A fifth aspect of the present invention provides a location server comprising: control circuitry, a transmitter and a receiver; wherein said control circuitry is configured to control said transmitter to transmit an enhanced position measurement request to at least one user equipment; said receiver is operable to receive from said user equipment an enhanced reference time difference signal comprising a reference signal time difference measurement indicating a difference in time of arrival between a signal from one network node and from a reference network node, and at least one time offset signal indicating a time difference between an arrival of peaks in a position reference signal received at said user equipment from at least one of said network node and said reference network node.

In some embodiments the location server further comprises: an analyser operable to analyse said time offset signal to estimate a time of arrival of said position reference signal at said user equipment travelling to said user equipment via a line of sight route; and correcting circuitry operable to update said reference time difference signal where said analysis indicates a line of sight route time of arrival of said position reference signal is different to said time of arrival of said peak.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Embodiments seek to provide an enhanced reference time difference signal which includes time offset information indicative of a difference in time of arrival of different peaks in a PRS signal received at a user equipment. This additional information has the advantage of being able to be transmitted with a relatively low overhead and yet provides a location server with information that is relevant to whether a time of arrival of a PRS signal used in RSTD measurements might require correction due to multipath effects. In this regard the time offset may be included in signals from all user equipment that have the enhanced capability, or it may be included only in response to a request for such information from the location server.

User equipment with the capability may provide the enhanced signal for a selected subset of network nodes, for example only the reference network node, or only network nodes where the received PRS signal has multiple peaks of similar amplitude. In this regard a predetermined amplitude difference threshold value may be used to determine whether peaks are similar in amplitude or not. This threshold value may be an absolute value or may be a relative value, such that peaks above a certain percentage say 50% of the largest received peak are included in the peak time offset values.

The offset value may be a difference in time between each peak included in the enhanced signal and a first or a baseline peak. Alternatively the offset value may be the difference in time between neighbouring peaks, or it may be an average time of arrival for the different peaks.

Amplitudes values may also be sent along with the time offset values, and these may be absolute amplitude values, offset values indicating a difference in amplitude between peaks and/or an average peak value.

Figure 1:
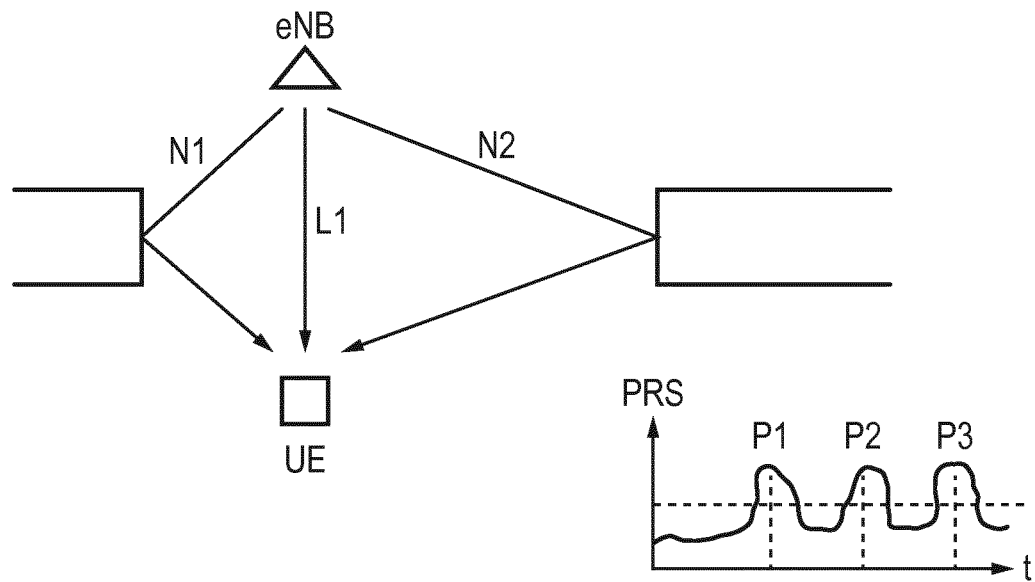
FIG. 1 shows an example arrangement of user equipment and a base station providing a cell to illustrate line-of-sight (LoS) and non-line-of-sight (nLoS) paths for the PRS between the user equipment and base station.

FIG. 1 shows an example arrangement of user equipment and a base station providing a radio cell to illustrate line-of-sight (LoS) and non-line-of-sight (NLoS) paths for the PRS between the user equipment and base station. In this example arrangement, a LoS path L1 exists between the user equipment and base station. Buildings or objects exist which reflect the PRS and as a result of reflections from these, a NLoS path N1 exists between the user equipment and base station, as well as a NLoS path N2.

As can be seen in FIG. 1, the user equipment when monitoring for the PRS detects three peaks P1, P2, P3, which correspond to the signals received over paths L1, N1 and N2, respectively. If the time of arrival of the peaks is used to estimate the location of the user equipment, it can be appreciated that were P2 or P3 to be used rather than P1, the user equipment would appear to be further from the base station than it actually is.

Figure 2:
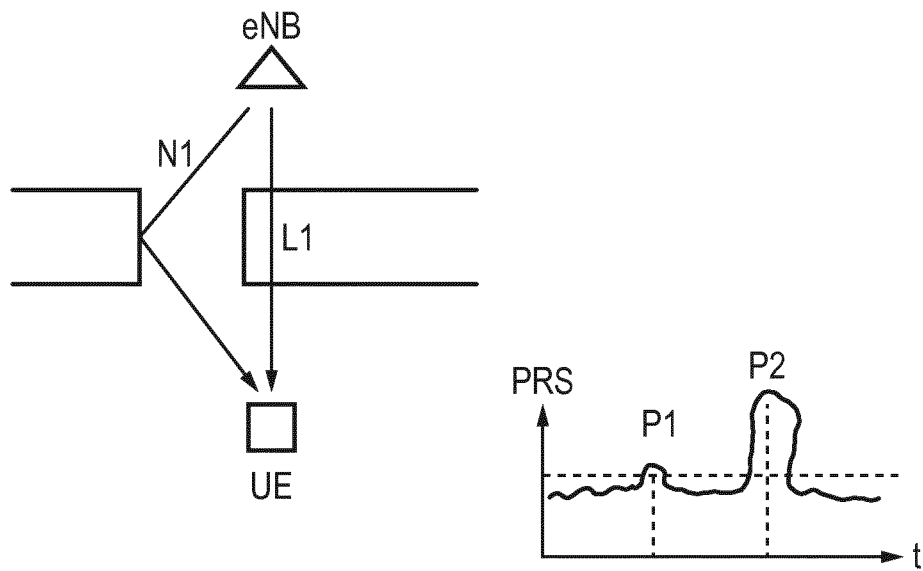
FIG. 2 shows another example arrangement of user equipment and a base station providing a cell to illustrate line-of-sight (LoS) and non-line-of-sight (nLoS) paths for the PRS between the user equipment and base station.

FIG. 2 shows another example of user equipment and a base station providing a cell to illustrate line-of-sight (LoS) and non-line-of-sight (NLoS) paths for the PRS between the user equipment and base station. In this example arrangement, a weak LoS path L1 exists between the user equipment and base station. The strength of the signal travelling via this path is attenuated by buildings. There is also a NLoS path N1 between the user equipment and base station which does not suffer the same attenuation.

As can be seen in FIG. 2, the user equipment when monitoring for the PRS detects two peaks P1, P2 which correspond to the signals received over paths L1 and N1 respectively. The signal P1 received via path L1 is attenuated due to the building and therefore is a much weaker peak than peak P2. Were the user equipment to use peak P2 in its RSTD measurement then again the user equipment would appear to be further from the base station than it actually is.

As can be appreciated when determining a position of a user equipment using a time difference of arrival at a user equipment of PRS signals from different network nodes, the path taken by the signal has an effect on the estimated position. In this regard where a direct path is assumed and where the path taken is not direct then it will appear from the estimation that the user equipment is located further away from the network node than it actually is.

As can be seen from the graphs of the received signals there may be multiple peaks within a noisy signal, and determining which peak corresponds to the arrival of the PRS signal via a direct LoS route may not be straightforward.

To address this various embodiments are provided for reference signal time difference (RSTD) reporting by user equipment to a network node such as a location server where the user equipment measures multiple peaks in the positioning reference signal (PRS), and transmit some indication of the difference in time between the multiple peaks, these embodiments are summarized as follows:

Embodiment 1—First-Peak-Based Time Offset Reporting

In this embodiment, the user equipment detects the first peak (a detected PRS over or exceeding a threshold amount) as the baseline for the reporting of the time of arrival of the rest of the reported peaks in the same cell, as well as for RSTD reporting. The RSTD signal relates to the time difference between this first peak and a peak from a reference cell. Further signals are transmitted indicating a difference in time between receipt of subsequent peaks and this first peak in that cell.

Embodiment 2—Accumulated Time Offset Reporting

In this embodiment, the user equipment detects the first peak (a detected PRS over or exceeding a threshold amount) for RSTD reporting but the reported time offset is the time offset of two contiguous (or adjacent) peaks in the same cell. In other words for each peak subsequent to the first peak an offset time is reported that is a time difference between the time of that peak and an immediately preceding peak.

Embodiment 3—Rich RSTD Reporting for Reference Cell Only

In this embodiment, the user equipment only reports time offset information of the reference cell since reference cell is the baseline of RSTD reporting for all neighbouring cells. It may report it in the manner described in either embodiment 1 or 2.

Embodiment 4—Rich RSTD Reporting for Neighbouring Cell Only

In this embodiment, the user equipment only reports time offset information of neighbouring cells since the reference cell might be the best cell for the UE to estimate the ToA (time of arrival). Again it may report it in the manner described in either embodiment 1 or 2.

Embodiment 5—Recommended-Peak-Based Time Offset Reporting

In this embodiment, the user equipment uses the recommended peak (which is selected by the UE) as the baseline for the reporting of the time of arrival of the other peaks in the same cells as well as in the RSTD reporting. This "recommended" peak may be the highest amplitude peak, or a first peak above a certain threshold.

Embodiment 6—RMS Delay Spread Reporting

In this embodiment, the time offset mentioned in Embodiments 1 to 4 is replaced by a root mean square (RMS) delay spread that is the average time delay between each of the peaks.

Embodiment 7—Amplitude Information Reporting

In this embodiment, the user equipment information relating to the amplitude of one or more peaks is reported.

It will be appreciated that features of these embodiments may be combined as appropriate. Each of these embodiments will now be described in more detail.

Embodiment 1 First-Peak-Based Time Offset Reporting

First-peak-based time offset reporting uses the first peak (over some threshold) as the baseline for the reporting of the time of arrival of the rest of the reported peaks in the same cells as well as for RSTD reporting.

Figure 3:
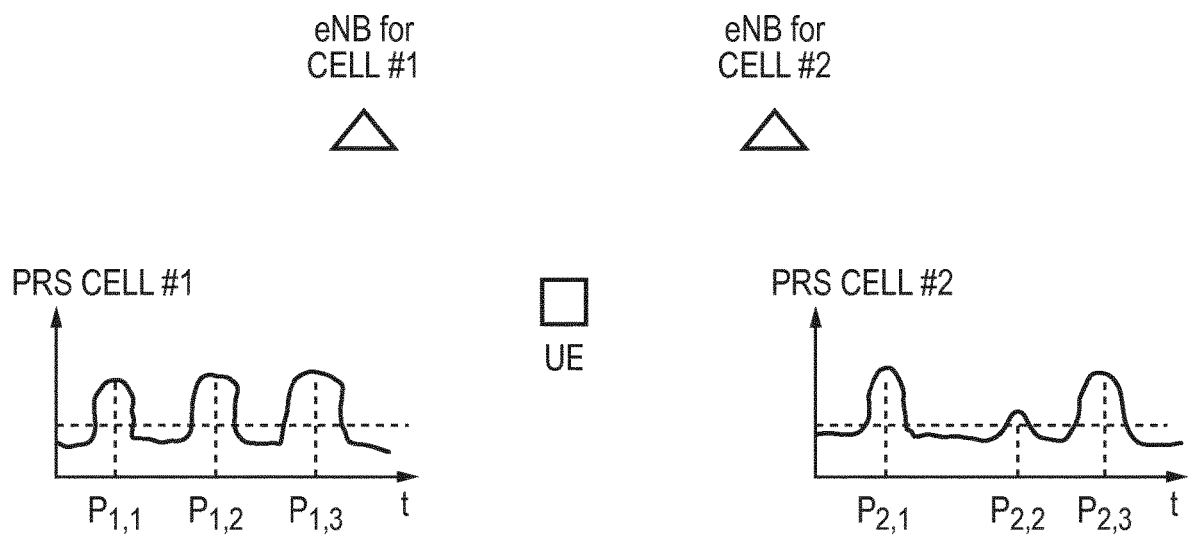
FIG. 3 shows reception of PRS signals from two cells according to one embodiment.

As illustrated in FIG. 3, consider the example where there are two cells, cell #1 and cell #2. The ToAs of the measured first three earliest peaks from cell #1 to the UE is $p_{1,1}$, $p_{1,2}$, $p_{1,3}$ and $p_{1,1} < p_{1,2} < p_{1,3}$. The ToAs of the measured first three earliest peaks from cell #2 to this UE is $p_{2,1}$, $p_{2,2}$, $p_{2,3}$ and $p_{2,1} < p_{2,2} < p_{2,3}$. Cell #2 is the reference cell for RSTD reporting. It should be noted that P1,1 is the first peak of the first cell, while P1,2 is the second peak of the first cell. Similarly P2,1 is the first peak of the second cell.

Then the RSTD reporting information from UE and corresponding to cell #1 and cell #2 typically includes:

Time offset in the reference cell (cell #2)

$\Delta_{cell\{2\},peak\{2,1\}} = P_{2,2} - P_{2,1}$ $\Delta_{cell\{2\},peak\{3,1\}} = P_{2,3} - P_{2,1}$ Time offset in the neighboring cell (cell #1)

$\Delta_{cell\{1\},peak\{2,1\}} = P_{1,2} - P_{1,1}$ $\Delta_{cell\{1\},peak\{3,1\}} = P_{1,3} - P_{1,1}$ RSTD corresponding to neighboring cell (cell #1) and reference cell (cell #2)

$\Delta_{cell\{1,2\},peak\{1,1\}} = P_{1,1} - P_{2,1}$

It will be appreciated that time offset reporting is beneficial for overhead reduction so that the UE needs fewer bits for multiple hypothesis reporting.

Signalling Design

In the existing LTE/LTE-A network, the existing signalling for RSTD measurement reporting is:

```
OTDOA-SignalMeasurementInformation ::= SEQUENCE {
    systemFrameNumber          BIT STRING (SIZE (10)),
    physCellIdRef              INTEGER (0..503),
    cellGlobalIdRef            ECGI                       OPTIONAL,
    earfcnRef                  ARFCN-ValueEUTRA           OPTIONAL,    -- Cond NotSameAsRef0
    referenceQuality           OTDOA-MeasQuality          OPTIONAL,
    neighbourMeasurementList   NeighbourMeasurementList,
    ...,
    [[ earfcnRef-v9a0          ARFCN-ValueEUTRA-v9a0      OPTIONAL     -- Cond NotSameAsRef1
    ]]
}
NeighbourMeasurementList ::= SEQUENCE (SIZE(1..24)) OF NeighbourMeasurementElement
NeighbourMeasurementElement  ::= SEQUENCE {
    physCellIdNeighbour        INTEGER (0..503),
    cellGlobalIdNeighbour      ECGI                       OPTIONAL,
    earfcnNeighbour            ARFCN-ValueEUTRA           OPTIONAL,    -- Cond NotSameAsRef2
    rstd                       INTEGER (0..12711),
    rstd-Quality               OTDOA-MeasQuality,
    ...,
    [[ earfcnNeighbour-v9a0    ARFCN-ValueEUTRA-v9a0      OPTIONAL     -- Cond NotSameAsRef3
    ]]
}
```

In this embodiment, for first-peak-based time offset reporting, the existing signalling above may be updated to:

```
OTDOA-SignalMeasurementInformation ::= SEQUENCE {
    systemFrameNumber          BIT STRING (SIZE (10)),
    physCellIdRef              INTEGER (0..503),
    cellGlobalIdRef            ECGI                       OPTIONAL,
    earfcnRef                  ARFCN-ValueEUTRA           OPTIONAL,    -- Cond NotSameAsRef0
    referenceQuality           OTDOA-MeasQuality          OPTIONAL,
    TimeOffsetSet              TimeOffset                 OPTIONAL,
    neighbourMeasurementList   NeighbourMeasurementList,
    ...,
    [[ earfcnRef-v9a0          ARFCN-ValueEUTRA-v9a0      OPTIONAL     -- Cond NotSameAsRef1
    ]]
}
NeighbourMeasurementList ::= SEQUENCE (SIZE(1..24)) OF NeighbourMeasurementElement
NeighbourMeasurementElement  ::= SEQUENCE {
    physCellIdNeighbour        INTEGER (0..503),
    cellGlobalIdNeighbour      ECGI                       OPTIONAL,
    earfcnNeighbour            ARFCN-ValueEUTRA           OPTIONAL,    -- Cond
```

```
NotSameAsRef2
    rstd                  INTEGER (0..12711),
    TimeOffsetSet         TimeOffset              OPTIONAL,
    rstd-Quality          OTDOA-MeasQuality,
    ...,
    [[ earfcnNeighbour-v9a0  ARFCN-ValueEUTRA-v9a0  OPTIONAL    -- Cond
NotSameAsRef3
    ]]
}
where
TimeOffsetSet ::= SEQUENCE {size(1..x)
        TimeOffset INTEGER (o..y),
}
```

| Item | Details |
|------|---------|
| x | Indicate the maximal number of reported time offsets for one cell. |
| y | Indicate the maximal value for time offset of considered reported peaks. The detailed time offset could be obtained by pre-defined Table. |

It will be appreciated that another example for y is bit-value rather than integer value. Where it is an integer value fewer bits are required to report the value, and the integer is representative of the time offset value. Thus, it may indicate a position in a table holding time values, or it may simply map to a particular value.

Thus, as can be seen the reporting scheme is similar to a conventional RSTD reporting scheme with the addition of the time offset set of values.

Embodiment 2—Accumulated Time Offset Reporting

In accumulated time offset reporting, the reported time offset is the time offset of two contiguous peaks. For example, in the example shown in FIG. 3, the RSTD reporting information from UE and corresponding to cell #1 and cell #2 includes:

Time offset in the reference cell (cell #2)

$\Delta_{cell\{2\},peak\{2,1\}} = p_{2,2} - p_{2,1}$ $\Delta_{cell\{2\},peak\{3,2\}} = p_{2,3} - p_{2,2}$ Time offset in the neighboring cell (cell #1)

$\Delta_{cell\{1\},peak\{2,1\}} = p_{1,2} - p_{1,1}$ $\Delta_{cell\{1\}, peak\{3,2\}} = p_{1,3} - p_{1,2}$ RSTD corresponding to neighboring cell (cell #1) and reference cell (cell #2)

$\Delta_{cell\{1,2\},peak\{1,1\}} = p_{1,1} - p_{2,1}$

An advantage of this embodiment is a reduced overhead. A disadvantage of this embodiment is possible accumulated time offset reporting error.

Signalling Design

The signalling design for accumulated time offset reporting is similar to first-peak-based time offset reporting.

Embodiment 3—Rich or Enhanced RSTD Reporting for Reference Cell Only

This embodiment only reports time offset information of the reference cell for further overhead reduction since reference cell is the baseline of RSTD reporting for all neighbouring cells.

Embodiment 4—Rich RSTD Reporting for Neighbouring Cell Only

This embodiment reports time offset information of neighbouring cells only for further overhead reduction since reference cell might be the best cell for the UE to estimate the ToA.

Embodiment 5—Recommended-Peak-Based Time Offset Reporting

In contrast to Embodiment 1, recommended-peak-based time offset reporting means that the baseline is selected by the UE and might not be the first peak, but may instead be another of the peaks. So the time offset value might correspond to a negative value or position value. For example, if the UE think the second peak has higher probability as the LoS than the first peak, then the UE could use the second peak as the baseline peak. It will be appreciated that this approach can also be used in Embodiments 2, 3 and 4 where other than the first peak is selected.

Embodiment 6—RMS Delay Spread Reporting

The time offset mentioned in Embodiments 1 to 4 is replaced by the root mean square (RMS) delay spread, which is the difference between the time of arrival of the earliest significant multipath component and the time of arrival of the latest multipath components.

Embodiment 7—Amplitude Information Reporting

In a first arrangement of this embodiment, the time offset information of Embodiments 1 to 5 and the RMS delay spread in Embodiment 6 is associated with corresponding amplitude offset(s) (i.e. the difference between the strength of a specific peak and the strength of a baseline peak) reporting and one baseline amplitude information for each cell.

In a second arrangement of this embodiment, the amplitude information (i.e. strength information) of the baseline peak in each cell and the amplitude information of each additional peak in Embodiments 1 to 5 and the RMS delay spread in Embodiment 6 are also reported by the UE.

Figure 4:
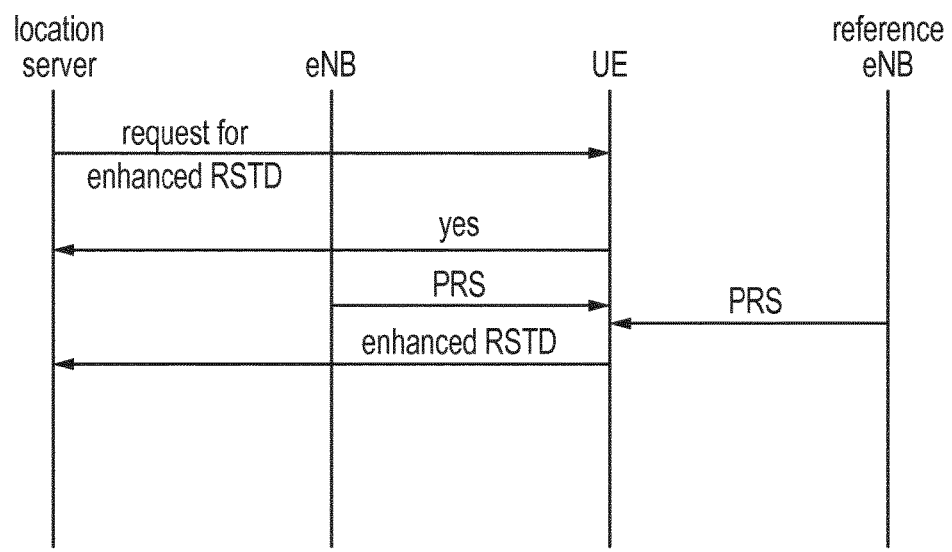
FIG. 4 schematically shows signals transmitted between user equipment and a location server.

FIG. 4 shows an example of signalling from a location server via a network node to a user equipment. In this regard the location server may be located on a network node or it may be more centrally located in a control node of the network. The location server transmits a request for enhanced RSTD measurements, and the UE may in some embodiments reply with an indication that it can provide such measurements. In other embodiments the UE may simply provide or not provide the enhanced signals depending on its capabilities.

The network nodes will then broadcast their position reference signals PRS, and the UE will respond with enhanced RSTD signals. These signals include a difference in time of arrival between a PRS from one node and from the reference node (a conventional RSTD signal) and a time offset signal indicating a time difference between time of arrival of different peaks in at least one of the received PRS signals.

The location server will estimate the UE's position from the RSTD signals and may correct these signals based on the time offset signal where it determines that the peak value used for the time of arrival for the RSTD signal may not have been a peak due to a signal taking a LoS route from the node to the UE.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a user equipment comprising:
monitoring for a position reference signal broadcast by a network node;
measuring a time of arrival of a peak in a received signal, said peak being indicative of receipt of said position reference signal and measuring a time of arrival of at least one further peak, said at least one further peak being indicative of receipt of the same position reference signal travelling via a different path;
transmitting a time offset signal indicative of a time difference between said arrival of said at least one further peak and said peak as part of an enhanced reference time difference signal.

2. A method according to claim 1, wherein said step of measuring said time of arrival comprises measuring a time of arrival of a plurality of further peaks; and
said step of transmitting said time offset comprises transmitting a time offset indicative of a time difference between said arrival of each of said further peaks and said peak.

3. A method according to claim 1, wherein said step of measuring said time of arrival comprises measuring a time of arrival of a plurality of further peaks; and
said step of transmitting said time offset comprises transmitting a time offset indicative of a time difference between said arrival of each of said peaks other than said first received peak and an immediately preceding peak.

4. A method according to claim 1, wherein said peak comprises one of a first peak in said position reference signal received by said user equipment and
a peak selected by said user equipment as a baseline peak.

5. A method according to claim 1, wherein said step of measuring said time of arrival comprises measuring a time of arrival of a plurality of further peaks; and
averaging a time of arrival of a first and a final peak of said received position reference signal and transmitting said averaged time of arrival as said offset signal.

6. A method according to claim 1, further comprising monitoring for a further position reference signal broadcast by a further network node;
measuring a time of arrival of a peak in a received signal, said peak being indicative of receipt of said further position reference signal, wherein said further network node comprises a reference network node, and said method further comprises:
transmitting a time difference between said measured time of arrival of said peak of said position reference signal and said measured time of arrival of said peak of said further position reference signal as a reference signal time difference measurement.

7. A method according to claim 1, further comprising monitoring for a further position reference signal broadcast by a further network node;

measuring a time of arrival of a peak in a received signal, said peak being indicative of receipt of said further position reference signal, wherein said network node comprises a reference network node, said method further comprising:
transmitting a time difference between said measured time of arrival of said peak of said further position reference signal and said measured time of arrival of said peak of said position reference signal as a reference signal time difference measurement.

8. A method according to claim 1, further comprising monitoring for a further position reference signal broadcast by a further network node;
measuring a time of arrival of a peak in a received signal, said peak being indicative of receipt of said further position reference signal and measuring a time of arrival of at least one further peak in said received signal;
transmitting a time offset signal indicative of a time difference between said arrival of said at least one further peak and said peak as part of an enhanced reference time difference signal.

9. A method according to claim 1, further comprising an initial step of receiving a request signal indicating that an enhanced position reference signal time difference measurement should be performed.

10. A method according to claim 1, further comprising measuring an amplitude of said peak and said at least one further peak and transmitting a signal indicative of said amplitudes.

11. A computer program which when executed by a processor is operable to control said processor to perform a method according to claim 1.

12. A non-transitory computer-readable memory storing computer readable instructions which, when executed by a processor, cause the user equipment to perform the method of claim 1.

13. A user equipment comprising:
at least one processor; and
at least one memory including computer program code;
wherein the at least one memory and computer program code are configured to, with the at least one processor, cause the user equipment to:
monitor for a position reference signal broadcast by a network node;
detect and measure a time of arrival of a peak in a received signal, said peak being indicative of receipt of said position reference signal and to detect and measure a time of arrival of at least one further peak in said received signal, said at least one further peak being indicative of receipt of the same position reference signal travelling via a different path;
determine a time difference between said arrival of said at least one further peak and said peak; and
transmit a time offset signal indicative of said determined time difference as part of an enhanced reference time difference signal.

14. A user equipment according to claim 13, wherein, in conjunction with measuring said time of arrival, the at least one memory and computer program code are configured to, with the at least one processor, further cause the user equipment to measure a time of arrival of a plurality of further peaks;
wherein, in conjunction with transmitting said time offset signal, the at least one memory and computer program code are configured to, with the at least one processor, further cause the user equipment to transmit a time offset indicative of a time difference between said arrival of each of said further peaks and said peak.

15. A user equipment according to claim 13, wherein the at least one memory and computer program code are configured to, with the at least one processor, further cause the user equipment to:
monitor for a further position reference signal broadcast by a further network node;
measure a time of arrival of a peak in a received signal, said peak being indicative of receipt of said further position reference signal, wherein said further network node comprises a reference network node; and
transmit a time difference between said measured time of arrival of said peak of said position reference signal and said measured time of arrival of said peak of said further position reference signal as a reference signal time difference measurement.

16. A user equipment according to claim 13, wherein the at least one memory and computer program code are configured to, with the at least one processor, further cause the user equipment to:
monitor for a further position reference signal broadcast by a further network node;
measure a time of arrival of a peak in a received signal, said peak being indicative of receipt of said further position reference signal, wherein said network node comprises a reference network node; and
transmit a time difference between said measured time of arrival of said peak of said further position reference signal and said measured time of arrival of said peak of said position reference signal as a reference signal time difference measurement.

17. A user equipment according to claim 13, wherein the at least one memory and computer program code are configured to, with the at least one processor, further cause the user equipment to:
monitor for a further position reference signal broadcast by a further network node;
measure a time of arrival of a peak in a received signal, said peak being indicative of receipt of said further position reference signal and measuring a time of arrival of at least one further peak in said received signal; and
transmit a time offset signal indicative of a time difference between said arrival of said at least one further peak and said peak as part of an enhanced reference time difference signal.

18. A user equipment according to claim 13, wherein the at least one memory and computer program code are configured to, with the at least one processor, further cause the user equipment to receive a request signal indicating that an enhanced position reference signal time difference measurement should be performed.

19. A method performed at a location server comprising:
receiving at least one enhanced reference time difference signal comprising:
a reference time difference signal indicating a difference in time of arrival between a peak in a position reference signal from one network node and a peak in a position reference signal from a reference network node; and
at least one time offset signal indicating a time difference between an arrival of a peak and a further peak in the same position reference signal received at said user equipment from at least one of said network node and said reference network node; said method further comprising analysing said time offset signal to estimate a time of arrival of said position reference signal at said user equipment travelling to said user equipment via a direct line of sight route; and updating said reference time difference signal where said analysis indicates a direct, line of sight time of arrival of said position reference signal is different to said time of arrival of said peak.

20. A method according to claim 19, comprising an initial step of transmitting an enhanced reference signal time difference measurement to at least one user equipment.

21. A computer program which when executed by a processor is operable to control said processor to perform a method according to claim 19.

22. A non-transitory computer-readable memory storing computer readable instructions which, when executed by a processor, cause the location server to perform the method of claim 19.

23. A location server comprising:

at least one processor; and at least one memory including computer program code;

wherein the at least one memory and computer program code are configured to, with the at least one processor, cause the location server to:

receive at least one enhanced reference time difference signal comprising:

a reference time difference signal indicating a difference in time of arrival between a peak in a position reference signal from one network node and a peak in a position reference signal from a reference network node; and at least one time offset signal indicating a time difference between an arrival of a peak and a further peak in the same position reference signal received at said user equipment from at least one of said network node and said reference network node; and further cause the location server to:

analyze said time offset signal to estimate a time of arrival of said position reference signal at said user equipment travelling to said user equipment via a direct route; and update said reference time difference signal where said analysis indicates a direct route time of arrival of said position reference signal is different to said time of arrival of said peak.

* * * * *